United States Patent
Foster

(10) Patent No.: US 8,100,800 B2
(45) Date of Patent: Jan. 24, 2012

(54) INTEGRATED MOTOR COOLING/CLUTCH BACKFILL SYSTEM FOR USE IN A HYBRID TRANSMISSION

(75) Inventor: Michael D. Foster, Carmel, IN (US)

(73) Assignee: GM Global Technology Operations LLC, Detroit, MI (US)

( * ) Notice: Subject to any disclaimer, the term of this patent is extended or adjusted under 35 U.S.C. 154(b) by 742 days.

(21) Appl. No.: 12/256,520

(22) Filed: Oct. 23, 2008

(65) Prior Publication Data

US 2009/0253546 A1 Oct. 8, 2009

Related U.S. Application Data

(60) Provisional application No. 61/042,382, filed on Apr. 4, 2008.

(51) Int. Cl.
*F16H 3/72* (2006.01)
*F16H 31/00* (2006.01)

(52) U.S. Cl. .......................................... 475/5; 475/116

(58) Field of Classification Search .................. 475/116, 475/127, 146
See application file for complete search history.

(56) References Cited

U.S. PATENT DOCUMENTS

| | | | | |
|---|---|---|---|---|
| 6,966,180 | B2* | 11/2005 | Deneir et al. | 60/327 |
| 2002/0060099 | A1* | 5/2002 | Takenaka et al. | 180/65.1 |
| 2002/0105225 | A1* | 8/2002 | Endo et al. | 303/152 |
| 2007/0026990 | A1* | 2/2007 | Takagi | 475/116 |
| 2007/0135253 | A1* | 6/2007 | Kondoh et al. | 475/116 |

* cited by examiner

*Primary Examiner* — Edwin A Young
(74) *Attorney, Agent, or Firm* — Quinn Law Group, PLLC

(57) ABSTRACT

A fluid is supplied to a housing of a hybrid transmission. An overall system line pressure is elevated to induce leakage of the fluid through a control system. The leaked fluid is flowed through at least one backfill passage to the housing of the hybrid transmission. The leaked fluid is flowed over the motors disposed within the housing to cool the motors. The fluid that is flowed over the motors is collected to create a head pressure within the housing. The head pressure forces the collected fluid upwards within the transmission housing and into clutches that are disposed therein.

14 Claims, 3 Drawing Sheets

INTEGRATED MOTOR COOLING/CLUTCH BACKFILL SYSTEM FOR USE IN A HYBRID TRANSMISSION

CROSS-REFERENCE TO RELATED APPLICATIONS

The subject patent application claims priority to and all the benefits of U.S. Provisional Patent Application Ser. No. 61/042,382, filed on Apr. 4, 2008, which is expressly incorporated herein by reference in its entirety.

TECHNICAL FIELD

The present invention relates to a system and method for cooling motors in a hybrid transmission.

BACKGROUND OF THE INVENTION

A hybrid transmission for a vehicle typically includes a plurality of clutches and a pair of electric motors for delivering mechanical power to a drive system of the vehicle. To operate properly, the transmission usually requires a supply of pressurized fluid, such as conventional transmission oil. The pressurized fluid may be used for such functions as cooling, lubrication, and, in some cases, operation of the torque transfer devices. The lubricating and cooling capabilities of transmission oil systems impact the reliability and durability of the transmission. Additionally, multi-speed transmissions require pressurized fluid for controlled engagement and disengagement of the torque transmitting mechanisms that operate to establish the speed ratios within the internal gear arrangement.

Typically, pressurized fluid flows from a pump through valves and passages in a first electro-hydraulic circuit to the clutches for operating the clutches. From within the transmission, the fluid drains into a sump in the transmission where it is reused. The electric motors in the hybrid transmission can transform electric power into mechanical power for operating the drive system. During operation of the transmission, the electric motors generate heat and cooling of the electric motors is required. To cool the motors, a second electro-hydraulic circuit is used to move fluid to cool the electric motors.

SUMMARY OF THE INVENTION

A method of supplying fluid to a housing of a hybrid transmission includes elevating an overall system line pressure to induce leakage of the fluid through a control system. The leaked fluid is directed through at least one backfill passage to the housing. The leaked fluid is directed over at least one motor within the housing to cool the at least one motor. The fluid directed over the at least one motor is collected to create a head pressure within the housing.

A control system for supplying a fluid to a hybrid transmission includes a trim valve that is configured to regulate flow of the fluid to the hybrid transmission. A supply line is operatively connected to the trim valve and configured to transport the fluid between the hybrid transmission and the trim valve. A backfill passage is operatively connected to the trim valve and configured to supply a leaked fluid from the trim valve to the hybrid transmission. A by-pass orifice operatively interconnects the supply line and the backfill passage and is configured to supply additional fluid to the hybrid transmission.

A hybrid transmission includes a housing. At least one electric motor and at least one clutch are disposed within the housing. A control system is in fluid communication with the housing and includes at least one valve that is configured to regulate flow of the fluid to the housing. A supply line operatively connects the valve and the housing to transport the fluid between the housing and the valve. A backfill passage operatively connects the valve and the housing to transport the fluid between the valve and the housing. A by-pass orifice operatively interconnects the supply line and the backfill passage. The by-pass orifice is configured to supply additional fluid to the housing.

Motor cooling and clutch backfill is achieved by utilizing leakage fluid from the trim valves and shift valve. The leakage fluid is normally dumped back to the transmission sump and wasted. By capturing and redirecting the leakage fluid toward motor windings of the motor, both motor cooling and clutch backfill is achieved in the most efficient manner. Without this configuration, a dedicated circuit must be added to provide the cooling of the motor, all the while, valve body leakage is continuously lost to the transmission sump. By combining the circuits into one, overall system efficiency is increased, which has a direct positive impact on fuel economy of the vehicle.

The above features and advantages and other features and advantages of the present invention are readily apparent from the following detailed description of the best modes for carrying out the invention when taken in connection with the accompanying drawings.

BRIEF DESCRIPTION OF THE DRAWINGS

Referring now to the figures, which are exemplary embodiments and wherein like elements are numbered alike.

DESCRIPTION OF THE PREFERRED EMBODIMENTS

Figure 1:
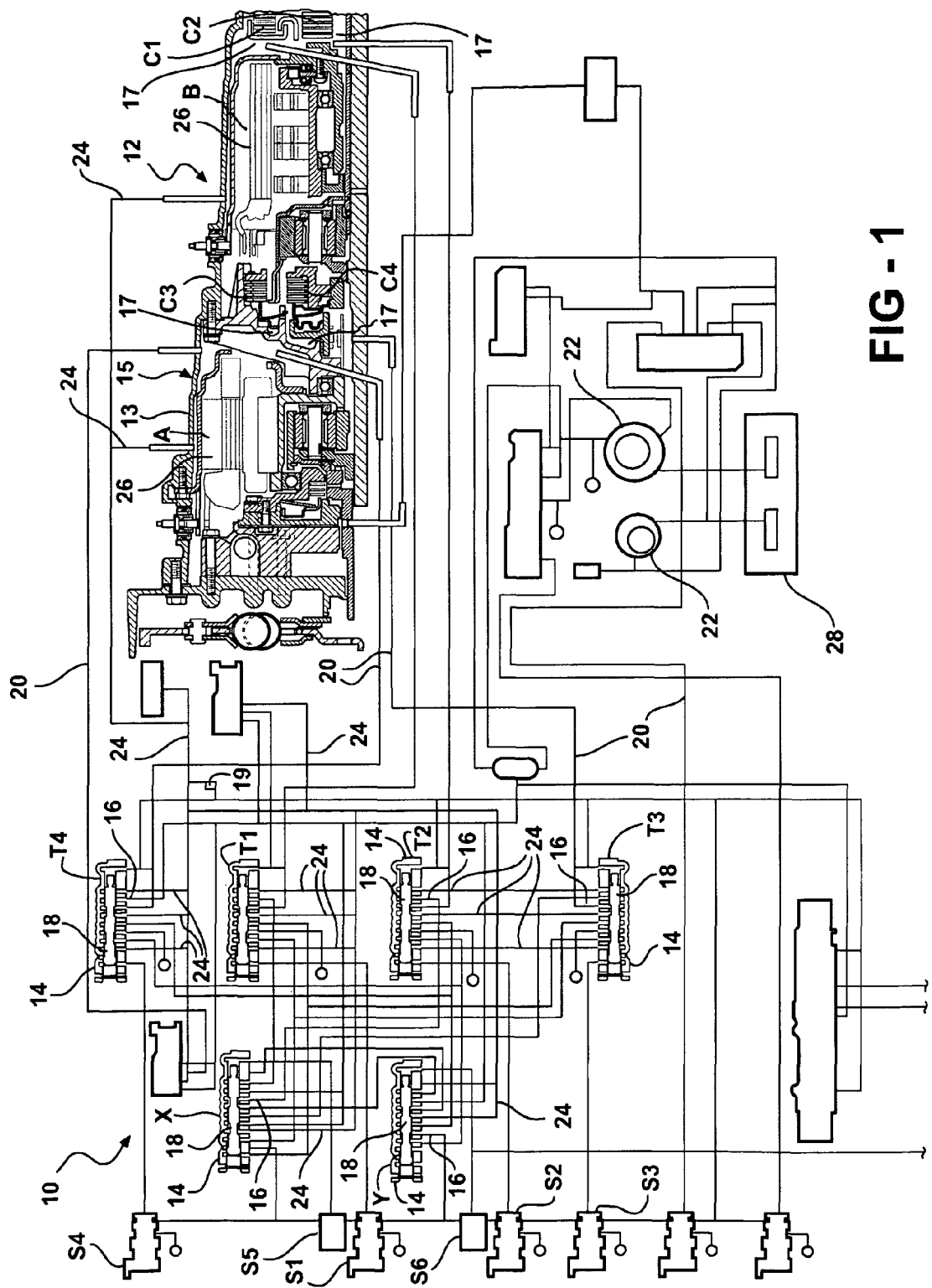
FIG. 1 is a schematic representation describing an electro-hydraulic control system utilized with a hybrid transmission.

Referring to the drawings, wherein like reference numbers refer to like components, FIG. 1 shows an electro-hydraulic control system 10 with a hybrid transmission 12. The hybrid transmission 12 may include a housing 13 with four clutches C1, C2, C3, and C4 and two electric motors A and B disposed within the housing 13.

The control system 10 may include four trim valves T1, T2, T3, and T4 and two shift valves X and Y. The trim valves T1, T2, T3, and T4 and two shift valves X and Y each include a valve body 14 defining at plurality of ports 16. A valve member 18 is slidably disposed within the valve body 14 between a stroked and an unstroked position. The valve bodies 14 of the trim valves T1, T2, T3, and T4 and the two shift valves X and Y are in fluid communication with the clutches C1, C2, C3, and C4 of the transmission 12 via an interconnected network of supply lines 20 for moving hydraulic fluid, oil, etc. through the control system 10 and the transmission 12 to control the clutches C1, C2, C3, and C4. The supply lines 20 are connected to the various ports 16 to provide the fluid communication within the valve body 14.

In addition, the control system 10 may include a plurality of solenoids S1, S2, S3, S4, S5, and S6 for controlling the trim valves T1, T2, T3, and T4 and the two shift valves X and Y. The solenoids S1, S2, S3, S4, S5, and S6 are configured such that each solenoid S1, S2, S3, S4, S5, and S6 is dedicated to a respective trim valve T1, T2, T3, and T4 or shift valve X and Y for moving the trim valve T1, T2, T3, and T4 or shift valve X and Y between a stroked position and an unstroked position to regulate the fluid entering and exiting the respective trim valve T1, T2, T3, and T4 or shift valve X and Y to control the clutches C1, C2, C3, and C4 within the housing 13.

The fluid loops between the housing 13 and the control system via the supply lines 20. The fluid is directed or flowed from the transmission 12 through the supply lines 20 and from the supply lines 20 through the trim valves T1, T2, T3, and T4 and the shift valves X and Y and back to the clutches C1, C2, C3, and C4 within the housing 13. The fluid may be moved through the supply lines 20, the trim valves T1, T2, T3, and T4, the shift valves X and Y, the transmission 12, etc. via a pump 22. The pump 22 may be a transmission pump, auxiliary pump, etc. During operation, as the fluid moves through the trim valves T1, T2, T3, and T4 and/or the shift valves X and Y, a small quantity of the fluid may leak between the valve body 14 and the valve member 18. The overall system line pressure may be elevated to induce leakage through the trim valves T1, T2, T3, and T4 and the shift valves X and Y. A plurality of backfill passages 24 extend from the ports 16 and interconnect the trim valves T1, T2, T3, and T4 and the shift valves X and Y within the valve body 14 within the transmission 12. The backfill passages 24 may generally extend to a top side 15 of the housing 13, over each of the motors A and B. The backfill passages 24 capture this fluid as it leaks from the trim valves T1, T2, T3, and T4 and/or the shift valves X and Y and the fluid flows within the backfill passages 24, at a generally low pressure, to the top side 15 of the housing 13 of the transmission 12. The leaked fluid is directed to flow over the motors A and B within the housing 13 to cool the motors A and B. Gravity feeds the fluid downward, from the top side 15 of the housing 13, over the motors A and B. The fluid that is directed to flow over the motors A and B is collected in the housing 13 and the fluid eventually fills upward, toward the top side 15 of the housing, to fill clutch piston cavities 17. The clutch piston cavities 17 that are located proximate a respective one of the clutches C1, C2, C3, and C4. The fluid flowing into the housing 13 creates a head pressure. The head pressure within the housing 13 forces the fluid upward, toward the top side 15 of the housing 13, and into the clutch piston cavities 17 and from the clutch piston cavities 17 into the clutches C1, C2, C3, and C4 at a low pressure to eliminate any air trapped within the clutches C1, C2, C3, and C4.

To provide additional fluid to the housing 13, at least one by-pass orifice 19 may be disposed between supply lines 20 and backfill passages 24. The by-pass orifice ensures that even if sufficient leakage cannot be attained through the trim valves T1, T2, T3, and T4 and/or the shift valves X and Y, an adequate quantity of fluid still flows through the backfill passages 24 to the top side 15 of the housing 13. Therefore, the by-pass orifice 19 restricts the flow of the fluid between the supply lines 20 and the backfill passages 24, while allowing a sufficient quantity of fluid to flow therethrough. The fluid is directed from the supply lines 20, through the by-pass orifice 19, to the backfill passages 24.

As described above, the leakage from within the trim valves T1, T2, T3, and T4 and/or the shift valves X and Y is routed through the backfill passages 24 to the motors A and B to cool stator windings 26 of the motors A and B. As the temperature within the control system 10 increases through operation of the transmission 12, the temperature of the motors A and B also increases. Therefore, as the temperature of the motors A and B increases, more fluid is required to achieve the desired cooling of the motors A and B. However, as the temperature within the control system 10 increases, the leakage of the fluid also increases, resulting in more fluid to meet the demand to cool the motors A and B. If, for some reason, enough fluid to cool the stator windings 26 of the motors A and B is not available, the valve members 18 may be moved within the valve body 14 to direct fluid directly into the backfill passages 24 to supplement the leaked fluid.

Figure 2:
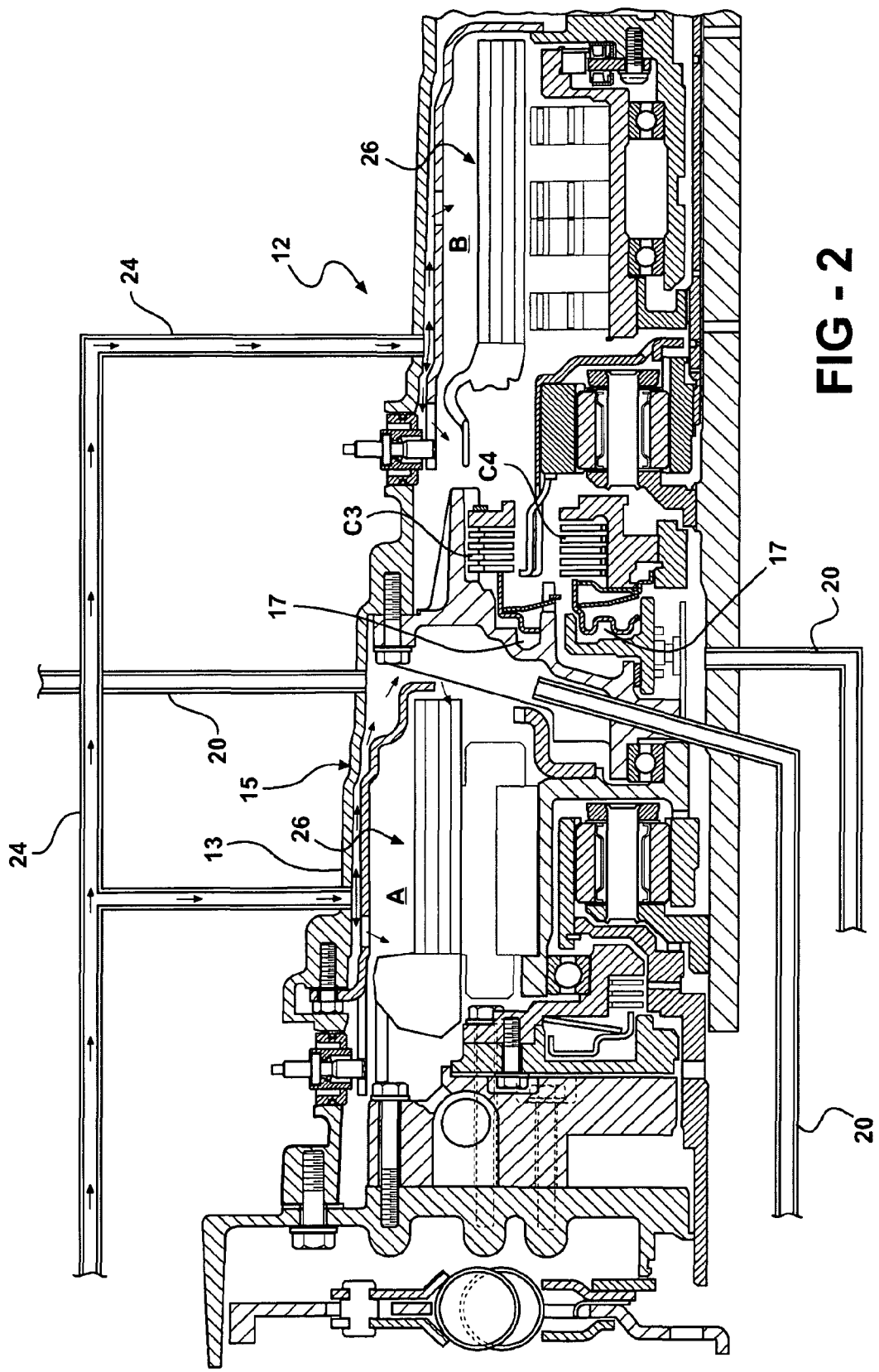
FIG. 2 is a partial schematic representation of the electro-hydraulic control system and hybrid of FIG. 1 showing a flow path for supplying cooling flow to the electric motors within the hybrid transmission to cool the electric motors.

The motors A and B are preferably disposed near the top side 15 of the housing 13 of the transmission 12. Referring to FIG. 2, placement of the motors A and B near the top side 15 of the transmission 12 allows the fluid to be sprayed to flow over the stator windings 26 of the motors A and B. From there, gravity may cause the fluid to flow down in the housing 13 and into a transmission sump 28 or some other similar device that is located near a bottom of the transmission 12 for reuse within the control system 10 and the transmission 12.

Figure 3:
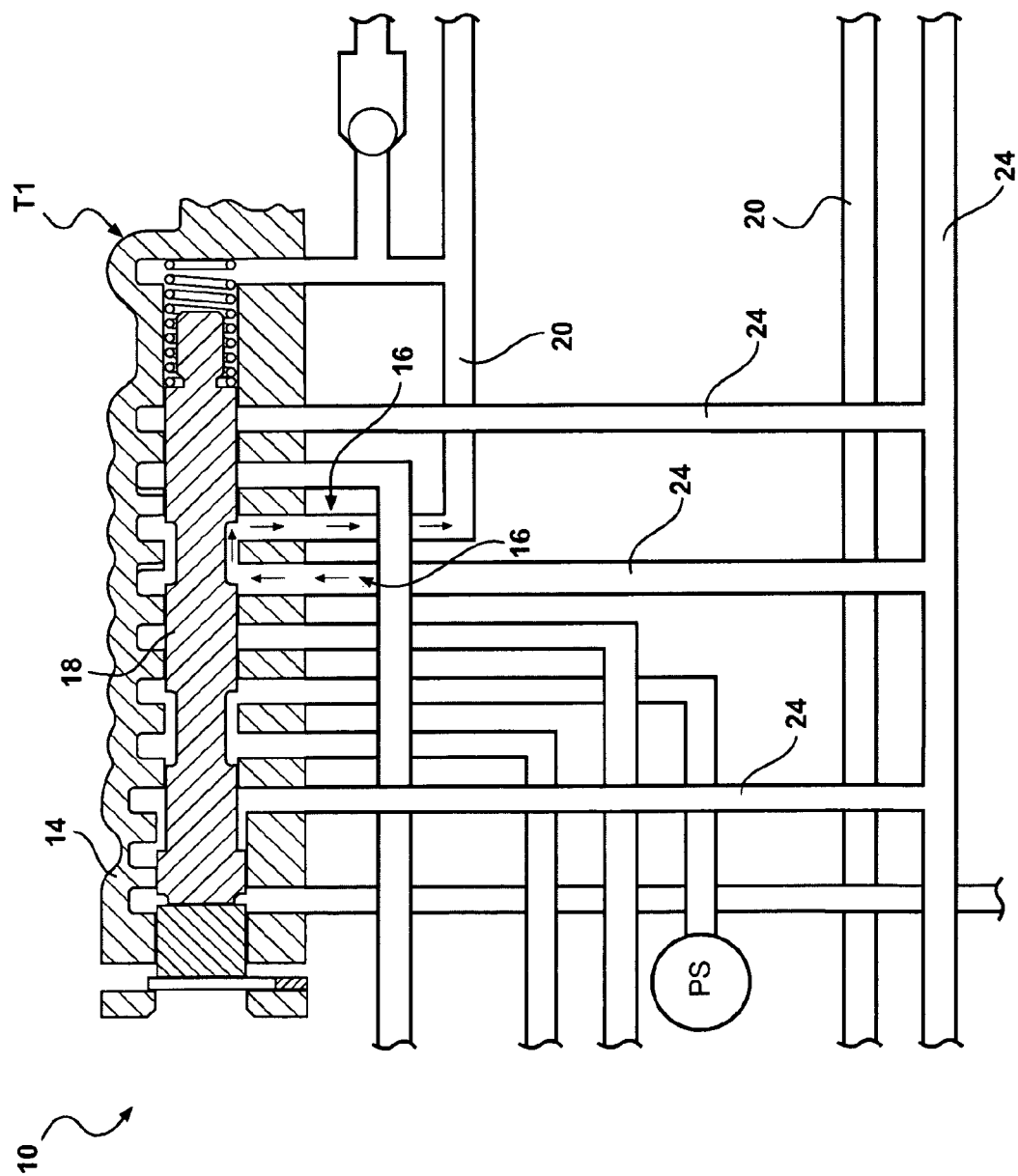
FIG. 3 is a partial schematic representation of the electro-hydraulic control system of FIG. 1 showing a flow path for backfilling a clutch via a trim valve to purge air from the clutch.

Referring now to FIG. 3, one of the trim valves T1 is shown. One of the backfill passages 24 interconnects the trim valve T1 and the corresponding clutch C1. The backfill pressure within the backfill passages 24 is sufficient enough to prefill or "backfill" the clutch C1, i.e., purge air that may be contained within the clutch C1 when the clutch C1 is in an unapplied state. It should be appreciated that although FIG. 3 only shows the backfill configuration for purging air from clutch C1 via trim valve T1, a similar arrangement exists between each of the other trim valves T2, T3, and T4 to purge any air from the corresponding clutches C2, C3, and C4.

While the best modes for carrying out the invention have been described in detail, those familiar with the art to which this invention relates will recognize various alternative designs and embodiments for practicing the invention within the scope of the appended claims.

The invention claimed is:

1. A method of supplying fluid to a housing of a hybrid transmission, said method comprising the steps of:
    elevating an overall system line pressure to induce leakage of the fluid through a control system;
    directing the leaked fluid through at least one backfill passage to the housing; and
    directing the leaked fluid over at least one motor within the housing to cool the at least one motor;
    collecting the fluid directed over the at least one motor to create a head pressure within the housing.

2. A method, as set forth in claim 1, further comprising forcing the collected fluid upward within the housing and into at least one clutch piston cavity within the housing as a function of the head pressure.

3. A method, as set forth in claim 2, further comprising forcing the collected fluid from the at least one clutch piston cavity into a respective clutch as a function of the head pressure to purge air from within the respective clutch.

4. A method, as set forth in claim 1, wherein collecting the fluid is further defined as collecting the fluid directed over the at least one motor in a sump to create a head pressure within the housing.

5. A method, as set forth in claim 1, further comprising:
    directing the fluid from the transmission through at least one supply line;
    directing the fluid from the at least one supply line through at least one valve.

6. A method, as set forth in claim 5, wherein directing the fluid from the transmission through the at least one supply line is further defined as pumping the fluid from the transmission through the at least one supply line.

7. A method, as set forth in claim 5, wherein elevating an overall system line pressure to induce leakage of the fluid through a control system is further defined as elevating an overall system line pressure to induce leakage of the fluid through the at least one valve.

8. A method, as set forth in claim 7, further comprising directing the fluid from the at least one valve through the at least one backfill passage.

9. A method, as set forth in claim 1, wherein elevating the overall system pressure to induce leakage is further defined as elevating the overall system pressure to induce leakage of the fluid through at least one of a trim valve and a shift valve.

10. A method, as set forth in claim 1, further comprising directing the fluid from the at least one supply line through a by-pass orifice to the at least one backfill passage.

11. A control system for supplying a fluid to a hybrid transmission, said control system comprising:
at least one valve configured to regulate flow of the fluid to the hybrid transmission;
at least one supply line operatively connected to said at least one valve and configured to transport the fluid between the hybrid transmission and said valve;
at least one backfill passage operatively connected to said at least one valve and configured to supply a leaked fluid from said at least one valve to the hybrid transmission; and
a by-pass orifice operatively interconnecting said at least one supply line and said at least one backfill passage and configured to supply additional fluid through said at least one backfill passage to the hybrid transmission.

12. A control system, as set forth in claim 11, wherein said at least one valve is at least one of a trim valve and a shift valve.

13. A control system, as set forth in claim 11, further comprising a pump operatively connected to said at least one supply line and operable for transporting the fluid from the hybrid transmission through said at least one supply line.

14. A hybrid transmission comprising:
a housing;
at least one electric motor disposed within said housing;
at least one clutch disposed within said housing;
at least one supply line in fluid communication with said housing;
at least one valve in fluid communication with at least one of said supply lines and configured for regulating flow of a fluid from said housing;
a backfill passage in fluid communication with said at least one valve and a top side of said housing and configured to transport the fluid between said at least one valve and said housing and over said at least one electric motor; and
a by-pass orifice operatively interconnecting said supply line and said backfill passage and configured to supply additional fluid through said at least one backfill passage to said housing.

\* \* \* \* \*